(No Model.)
A. B. FISHER.
SAW SETTING DEVICE.
No. 419,192. Patented Jan. 14, 1890.
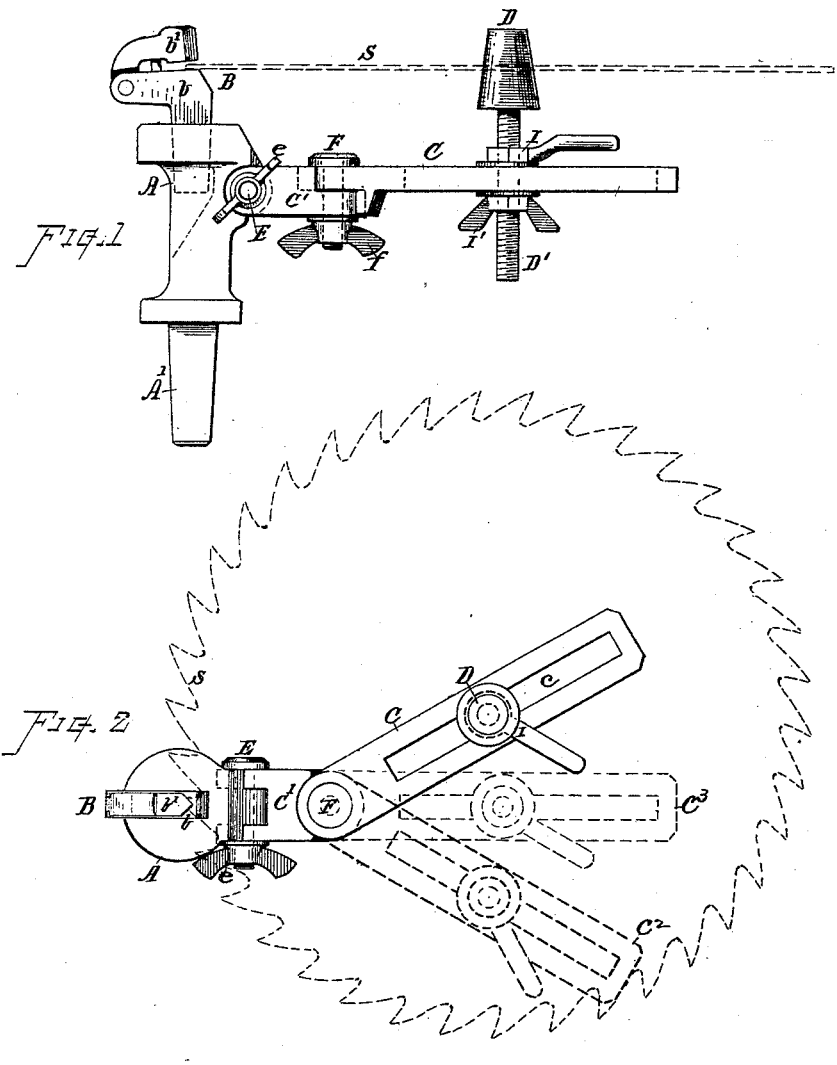
Witnesses.
Ella P. Blennd
Simeon E. King
Inventor
Alvan B. Fisher
By Chas. H. Burleigh
Attorney

UNITED STATES PATENT OFFICE.

ALVAN B. FISHER, OF STERLING, MASSACHUSETTS, ASSIGNOR OF ONE-HALF TO ELI H. BRIGHAM, OF SAME PLACE.

SAW-SETTING DEVICE.

SPECIFICATION forming part of Letters Patent No. 419,192, dated January 14, 1890.

Application filed May 11, 1889. Serial No. 310,375. (No model.)

*To all whom it may concern:*

Be it known that I, ALVAN B. FISHER, a citizen of the United States, residing at Sterling, in the county of Worcester and State of Massachusetts, have invented certain new and useful Improvements in Mechanism for Setting Circular Saws, of which the following, together with the accompanying drawings, is a specification sufficiently full, clear, and exact to enable persons skilled in the art to which this invention appertains to make and use the same.

The objects of my present invention are to provide an efficient, simple, and desirable mechanism for supporting and setting circular saws, to provide convenient facilities for adjustment, to accommodate saws of different sizes and different sizes of eye or central opening, facilities for adjustment to accommodate the inclination or degree of set, and facilities for adjustment to accommodate different degrees of rake or draft in the teeth, either in right or left positions. These objects I attain by the mechanism shown and described.

In the drawings, Figure 1 is a side view, Fig. 2 is a plan view, and Fig. 3 a perspective view, of my improved mechanism for setting circular saws.

My improved mechanism comprises a standard or body on which the setting-dies are mounted, and an adjustable arm or supporter carrying an upwardly-projecting pin or stud for centering and supporting the circular saw at proper position to be acted upon by the setting-dies, or so that the saw can be swung around to bring the teeth consecutively in position to be set.

In the drawings, A denotes the body or standard, which is best provided with a suitable stem or shank A', whereby it can be fixed or held in upright position in a block or vise when in use.

B indicates the setting-dies mounted in the top of the standard A. Said dies can be of the usual well-known style, with the anvil $b$ and the hinged hammer striking jaw $b'$. The shank of the anvil $b$ is set into an opening in the top of the standard A, as shown, or the dies can be otherwise secured in position with the jaws or dies facing in the direction indicated.

C is an arm which carries the saw-centering stud D. Said arm is connected with the standard A in a manner to afford upward and downward and lateral adjustment, the joint-piece C' being hinged to the standard by a horizontal hinge axis at E and to the arm proper by a vertical hinging axis at F, the axes or hinge-bolts being respectively provided with nuts or thumb-screws $e$ and $f$, whereby the joints can be firmly clamped for retaining the parts at positions of adjustment. The saw-supporting stud D is made of conoidal form, so that it will enter and fill the eye or central opening of the saw S, which is placed thereon, as indicated by dotted lines, and by reason of its varying diameter fit different diameters of eye. Said stud is made upwardly and downwardly adjustable in the arm C, so that when a saw having a large eye is placed thereon the stud can be raised to bring its lower or larger diametered part level with the dies B, and when a saw with a small eye is placed thereon it can be lowered to bring its smaller diameter level with the dies. In the present instance said stud is provided with a screw-threaded shank D', that passes through a slot $c$ in the arm C, and nuts I and I' are fitted on said threaded shank, as indicated, the vertical adjustment being effected by turning the nuts up or down on the shank, as required. The stud is adjustable toward or from the dies to accommodate saws of different sizes by moving it along the slot $c$ and clamping it at the required position by the nuts I I' above and below arm C. The joint E affords upward and downward adjustment of the arm to vary the inclination of the saw in relation to the setting-dies, and thus cause the teeth to be set out from the plane of the saw to a greater or less degree. The joint F affords lateral adjustment of the arm C to carry the saw-supporting stud D more or less to the right or left in relation to the axis of the setting-dies to accommodate the forward rake or draft of the saw-teeth. When one half of the raking teeth have been set, the arm C is adjusted to the opposite position (see dotted lines $C^2$, Fig. 2) and the saw is placed on the stud with its other side up, and the remainder of the teeth are then in like manner set. For saws with radial teeth the arm C is adjusted at central position. (See dotted line C³.)

In the operation the saw is centered and supported on the stud D, which stud is adjusted so that the tooth of the saw will properly come between the jaws b and b'. The tooth is set by a blow of a hammer upon the jaw b' in the usual manner. The saw is partially revolved on the stud D as a center to bring the successive teeth into the dies B.

It will be understood that I do not claim the particular form of setting-dies B, as such are well known.

I claim as my invention to be secured by Letters Patent—

1. The combination of the standard A, the saw-setting dies B, supported thereon, the slotted supporting-arm C, the centering-pin D, having a conical top for receiving saws with different sizes of opening, and the shank D', longitudinally adjustable in the slot of said arm, the nuts I and I' on said shank, the hinge F, having the vertical axis for giving lateral adjustment of the arm, and the hinge E, having the horizontal axis connecting said arm and standard, substantially as set forth.

2. The combination of the standard A, the saw-setting dies B, the arm C, the conoidal supporting and centering stud D, having the threaded shank D', and nuts I I' for effecting adjustment of said stud on the said arm, the hinges E and F, connecting the arm to the standard and affording lateral and vertical swinging adjustment thereof, and means, substantially as described, for clamping the joints and retaining the parts at positions of adjustment, as set forth.

Witness my hand this 9th day of May, A. D. 1889.

ALVAN B. FISHER.

Witnesses:
CHAS. H. BURLEIGH,
ELLA P. BLENUS.